US011248073B2

(12) United States Patent
Al-Malki (10) Patent No.: US 11,248,073 B2
(45) Date of Patent: Feb. 15, 2022

(54) MANUFACTURING POLYMERS OF THIOPHENE, BENZOTHIOPHENE, AND THEIR ALKYLATED DERIVATIVES

(71) Applicant: Saudi Arabian Oil Company, Dhahran (SA)

(72) Inventor: Abdullah R. Al-Malki, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/865,201

(22) Filed: May 1, 2020

(65) Prior Publication Data

US 2020/0262949 A1 Aug. 20, 2020

Related U.S. Application Data

(60) Division of application No. 14/887,912, filed on Oct. 20, 2015, now Pat. No. 10,689,466, which is a continuation of application No. 13/902,176, filed on May 24, 2013, now Pat. No. 9,193,832.

(60) Provisional application No. 61/655,195, filed on Jun. 4, 2012.

(51) Int. Cl.
    *C08F 128/06*     (2006.01)
    *C08G 75/06*     (2006.01)
    *C08G 61/12*     (2006.01)
    *B01J 19/24*     (2006.01)

(52) U.S. Cl.
CPC ........... *C08F 128/06* (2013.01); *B01J 19/24* (2013.01); *C08G 61/126* (2013.01); *C08G 75/06* (2013.01); *B01J 2219/24* (2013.01); *C08G 2261/3223* (2013.01)

(58) Field of Classification Search
CPC ............... C08G 61/126; C08G 2261/3223
USPC ....................... 528/377, 378, 380
See application file for complete search history.

(56) References Cited

U.S. PATENT DOCUMENTS

| 5,741,953 A * | 4/1998 | Preston .................. C07C 41/42 |
| | | 568/699 |
| 5,863,419 A | 1/1999 | Huff, Jr. et al. |
| 6,024,865 A | 2/2000 | Alexander et al. |
| 6,444,118 B1 | 9/2002 | Podrebarac et al. |
| 6,736,963 B2 | 5/2004 | Pradhan et al. |

(Continued)

FOREIGN PATENT DOCUMENTS

| CN | 202047021 | 11/2011 |
| DE | 19709185 A1 | 10/1997 |

(Continued)

OTHER PUBLICATIONS

Examination Report issued in related Singapore Patent Application No. 11201407974P, dated Sep. 21, 2015, 62 pages.

(Continued)

*Primary Examiner* — Shane Fang
(74) *Attorney, Agent, or Firm* — Bracewell LLP; Constance Gall Rhebergen (57) ABSTRACT

The present invention relates to apparatuses and processes for manufacturing polymers of thiophene, benzothiophene, and their alkylated derivatives. A process for manufacturing polymers that includes isolating a sulfur-containing heterocyclic hydrocarbon from cracked naphtha and reacting the sulfur-containing heterocyclic hydrocarbon with a super acid to produce a polymer.

6 Claims, 6 Drawing Sheets

(56) References Cited

U.S. PATENT DOCUMENTS

| | | |
|---|---|---|
| 7,446,077 B2 | 11/2008 | Ramirez-Corredores et al. |
| 7,837,861 B2 | 11/2010 | Umansky et al. |
| 8,293,411 B2 | 10/2012 | Nishida et al. |
| 2003/0034276 A1 | 2/2003 | Pradhan et al. |
| 2003/0230517 A1* | 12/2003 | Groten .................. C10G 45/40 208/209 |
| 2004/0186265 A1 | 9/2004 | Liu et al. |
| 2008/0105867 A1 | 5/2008 | Hsu et al. |
| 2010/0148124 A1 | 6/2010 | Reuter et al. |
| 2011/0174686 A1 | 7/2011 | Reynolds et al. |
| 2011/0174691 A1 | 7/2011 | Reynolds et al. |
| 2011/0190461 A1 | 8/2011 | Kita et al. |
| 2012/0245063 A1 | 9/2012 | Didiase et al. |

FOREIGN PATENT DOCUMENTS

| | | |
|---|---|---|
| EP | 2169023 A1 | 3/2010 |
| JP | 57-111825 | 12/1980 |
| WO | 9732914 A1 | 9/1997 |
| WO | 2005100464 A1 | 10/2005 |
| WO | 2012099672 A2 | 7/2012 |

OTHER PUBLICATIONS

Ito, E., et al., On Novel Processes for Removing Sulphur from Refinery Streams, Catalysis Today, pp. 446-460, vol. 116, www.elsevier.com/locate/cattod, Elsevier (2006).

Kiebooms et al., "Synthesis, Electrical, and Optical Properties of Conjugated Polymers", Handbook of Advanced Electronic and Photonic Materials and Devices, 2001, pp. 1-102 vol. 8, Academic Press.

Office Action in corresponding Japanese Application No. 2015-523176 dated Nov. 18, 2016.

Office Action issued in related Chinese Patent Application No. 201380029525.1, dated Aug. 27, 2015, 6 pages.

Qian Feng et al., Chemistry of Materials, vol. 9, No. 3, 1997, pp. 641-643.

Roncall, "Conjugated Poly(Thiophenes): Synthesis, Functionalization, and Applications" Chemical Reviews, 1992, pp. 711-738, vol. 92, American Chemical Society.

Brunet, S., et al., On The Hydrodesulfurization of FCC Gasoline: A Review, Applied Catalysis A: General, pp. 143-172, vol. 278, www.elsevier.com/locate/apcata, Elsevier (2005).

The International Search Report and Written Opinion for Related PCT Application PCT/US2013/042645, dated Aug. 8, 2013.

* cited by examiner

MANUFACTURING POLYMERS OF THIOPHENE, BENZOTHIOPHENE, AND THEIR ALKYLATED DERIVATIVES

This non-provisional application is a divisional application of U.S. patent application Ser. No. 14/887,912 filed on Oct. 20, 2015, which claims priority to U.S. Provisional Patent Application Ser. No. 61/655,195 filed on Jun. 4, 2012, and is a continuation of U.S. patent application Ser. No. 13/902,176, filed on May 24, 2013, which are all incorporated by reference in their entirety.

TECHNICAL FIELD

Described are methods and compositions for manufacturing polymers of thiophene, benzothiophene, and their alkylated derivatives. More specifically, the invention relates to manufacturing polymers by reacting thiophene, benzothiophene, or their alkylated derivatives with super acids.

DESCRIPTION OF THE RELATED ART

Hydrocarbon fluids, such as crude oil and the refined products of that crude oil, often have sulfur-containing compounds. These compounds are valuable when separated from the hydrocarbon fluids, but are problematic when maintained in the hydrocarbon fluids, as they can cause corrosion and create other health and safety concerns. These compounds are also difficult compounds to remove from crude oil.

Petroleum refineries process crude oil to separate the whole crude into useful petroleum products, such as naphtha, gasoil, diesel fuel, and the like. These cuts are then used, with or without further processing, for various purposes such as fuels, lubricants, and in the manufacture of various products (e.g., plastics, solvents, detergents). Because the petroleum components have different boiling points, the components can be separated using a series of distillation or refining columns.

Once separated and purified, petroleum fuels or lubricants may be sold without further refining. In contrast, certain intermediate products, such as naphtha or gasoil, can be further processed to produce a different slate of products, including polymers. For example, naphtha is used in the petrochemical industry for producing olefins using cracking processes. Heavy naphtha also tends to be rich in aromatics. Naphtha therefore forms a feedstock for furthering processing to produce polymers. Petroleum refineries can produce cracked naphtha by cracking fluid catalytic cracking ("FCC") feed of heavier crude oil fractions in an FCC unit, where discrete petrochemical products such as aromatics are also produced as a result of cracking. Aromatics such as benzene, toluene, and xylenes can be used to produce a variety of materials such as solvents, detergents, adhesives, and the like.

Typically, the aromatics carried with product in an FCC unit include heterocyclic sulfur-containing compounds such as thiophene and benzothiophene. Thiophene, benzothiophene, and their derivatives can be removed from cracked naphtha by the hydrodesulfurization ("HDS") process. Specifically, the naphtha feed can be reacted with pressurized $H_2$ in the presence of, for example, a molybdenum disulfide catalyst. Thiophene and benzothiophene are typically removed to reduce sulfur dioxide emissions and to prevent interference with metal catalysts used in the refining process.

Thiophene and benzothiophene are used to produce various agrochemicals and pharmaceuticals. In addition, the polymer forms of these sulfur-containing compounds exhibit conductive and optical properties that are desirable for various commercial and industrial applications. Specifically, polythiophene is currently being studied for uses in chemical sensors, solar cells, and batteries.

Polythiophene can be chemically synthesized using oxidants or cross-coupling catalysts. For example, thiophene can be polymerized using ferric chloride as an oxidation agent at room temperature. Such chemical synthesis typically results in a reaction mixture from which the polythiophene can be extracted. For example, the reaction mixture can be washed with water and a dilute aqueous ammonium hydroxide solution, where the polythiophene is then isolated through precipitation by pouring the solution into a nonsolvent such as methanol or acetone (see U.S. Patent Publication No. 2004/0186265, Liu et al., which is incorporated herein by reference).

It would be beneficial to develop a device that could not only remove thiophene, benzothiophene, and their derivatives during the refining process, but that could also generate useful products such as polythiophene from these sulfur-containing heterocyclic compounds.

SUMMARY

The apparatus and process of the current application are related to manufacturing polymers of thiophene, benzothiophene, and their alkylated derivatives. Initially, thiophene, benzothiophene, and their alkylated derivatives are collectively concentrated and separated from other FCC products such as diesel according to their boiling points temperature ranges. Thiophene, benzothiophene, and their alkylated derivatives can then be individually separated in high purity using several processes such as distillation, solvent extraction, oxidation/extraction, ionic liquid extraction or combinations of the same. Once separated, the benzothiophene, thiophene, or their derivatives can be reacted with super acid to form polymeric material.

This invention produces new polymers that exhibit improved chemical and physical properties in comparison to commercial, existing polymers.

In one embodiment, a process for manufacturing polymers includes isolating a sulfur-containing heterocyclic hydrocarbon from cracked naphtha and reacting the sulfur-containing heterocyclic hydrocarbon with a super acid to produce a polymer. The sulfur-containing heterocyclic hydrocarbon can be thiophene, an alkylated derivative of thiophene, benzothiophene, an alkylated derivative of benzothiophene, or a suitable combination thereof. In some embodiments, the process further includes isolating the cracked naphtha from a reaction product gas stream of an FCC unit, where the sulfur-containing heterocyclic hydrocarbon is isolated from the cracked naphtha according to a boiling point of the sulfur-containing heterocyclic hydrocarbon.

In some embodiments, the process further includes performing a solvent extraction using an aprotic solvent to further isolate the sulfur-containing heterocyclic hydrocarbon from other compounds of the cracked naphtha. In this case, the aprotic solvent rich in sulfur-containing heterocyclic hydrocarbons can be withdrawn from the bottom of a solvent extraction tank. Examples of the sulfur-containing heterocyclic hydrocarbon include thiophene, which has a boiling point of about 84° C. and benzothiophene, which has a boiling point of about 221° C.

In some embodiments, the process also includes using an aprotic solvent to concentrate the sulfur-containing heterocyclic compound such that the reaction timing is impacted as the super acid increases. Preferred aprotic solvents include acetonitrile or methylene chloride.

The invention also includes an apparatus having a primary distillation column adapted to isolate a cracked naphtha stream from a reaction product gas stream of a fluid catalytic cracking unit, a secondary distillation column adapted to isolate one or more sulfur-containing heterocyclic compounds from the cracked naphtha, and a reactor adapted to react the one or more sulfur-containing heterocyclic compounds with a super acid to produce a polymer of the one or more sulfur-containing heterocyclic compounds.

In some embodiments, the apparatus further includes a solvent extraction tank adapted to perform a solvent extraction using an aprotic solvent to further purify the one or more sulfur-containing heterocyclic compounds, where the aprotic solvent is acetonitrile or methylene chloride.

In some embodiments, the apparatus further includes a tertiary distillation column adapted to further isolate the one or more sulfur-containing heterocyclic compounds from other compounds of the cracked naphtha.

In some embodiments, the apparatus further includes a membrane separator adapted to further isolate the one or more sulfur-containing heterocyclic compounds as permeate from other compounds of the cracked naphtha, where the membrane separator allows the one or more sulfur-containing heterocyclic compounds to permeate through a cross-linked fluorinated polyolefin membrane, a polyester-imide membrane, a polyuria membrane, or a urethane membrane.

In some embodiments, the one or more sulfur-containing heterocyclic compounds includes thiophene, and the secondary distillation column has a side-cut with a boiling point range from about 82° C. to about 86° C. for isolating the one or more sulfur-containing heterocyclic compounds.

In some embodiments, the one or more sulfur-containing heterocyclic compounds includes benzothiophene, and the secondary distillation column has a side-cut with a boiling point range from about 218° C. to about 224° C. for isolating the one or more sulfur-containing heterocyclic compounds.

The invention also includes a process for manufacturing polymers by obtaining a sulfur-containing heterocyclic hydrocarbon and reacting the sulfur-containing heterocyclic hydrocarbon with a super acid to produce a polymer of the sulfur-containing heterocyclic hydrocarbon. The sulfur-containing heterocyclic hydrocarbon can be thiophene, an alkylated derivative of thiophene, benzothiophene, an alkylated derivative of benzothiophene, or a suitable combination thereof.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE DISCLOSURE

In one or more embodiments, the present invention relates to the manufacture of polymers from thiophene ("TP"), benzothiophene ("BT"), and/or their alkylated derivatives. TP, BT, and their derivatives can be separated from the cracked naphtha stream produced from the fluid catalytic cracking ("FCC") unit. The separated TP, BT, and their derivatives can then be reacted with super acids to produce the polymers. FCC cracked naphtha includes a substantial amount of TP, BT and their derivatives as shown in the gas chromatography results depicted in FIG. 1. TABLE 1 below lists some of the members of the TP and BT families that exist in cracked naphtha. Cracked naphtha and other hydrocarbon streams can also include additional aromatic sulfur containing hydrocarbons that can also be separated as described for TP, BT, and their derivatives. One of skill in the art will understand that while naphtha is described throughout the specification, other hydrocarbon streams containing TP, BT, and/or their alkylated derivatives, as well as other sulfur containing compounds, can be used in the various embodiments of the present invention. These hydrocarbon streams can include streams from Thermal cracking processes, or a combination of FCC and Thermal cracking processes, as well as from other known sources.

TABLE 1

TP and BT and their alkylated derivatives existing in FCC cracked naphtha.

| Thiophene Family | Benzothiophene family |
| --- | --- |
| Thiophene | Benzothiophene |
| 2-Methyl Thiophene | 7-MethylBenzothiophene |
| 3-Methyl Thiophene | 2-MethylBenzothiophene |
| 2-Ethyl Thiophene | 5 & 6 Methyl Benzothiophenes |
| 2,5-Dimethyl Thiophene | 3 & 4 Methyl Benzothiophenes |
| 2-Ethyl 5-Methyl Thiophene | 7-Ethyl Benzothiophene |
| 2,4-Dimethyl Thiophene | 2,7 Dimethyl-Benzothiophene |
| 2,3-Dimethyl Thiophene | 2-Ethyl Benzothiophene |
| 3,4-Dimethyl Thiophene | 2,8 & 2,5 Dimethyl Benzothiophene |
| 2-Ethyl-5-Methyl Thiophene | 2,4-Dimethyl Benzothiophene |
| 3-Ethyl 5-Methyl Thiophene | 3,5 & 3,6-Dimethyl Benzothiophene |
| 2-Ethyl 3-Methyl Thiophene | 2,3-Dimethyl Benzothiophene |
| 2-Ethyl 4-Methyl Thiophene | 6,7-Dimethyl-Benzothiophene |
| 3-Ethyl 2-Methyl Thiophene | 5,6-Dimethyl Benzothiophene |
| 2,3,5 Trimethyl Thiophene | 4,5-Dimethyl Benzothiophene |
| 3-Ethyl 2-Methyl Thiophene | 3,4-Dimethyl Benzothiophene |
| 2,3,4-Trimethyl Thiophene | 3,5-Dimethyl Benzothiophene |
| C4 Thiophenes | C-3 Benzothiophenes |
|  | C-4 Benzothiophenes |

TP and BT are sulfur-containing heterocyclic compounds that are typically considered to have little industrial value. Specifically, TP ($C_4H_4S$) is an aromatic hydrocarbon similar to benzene except TP is only a five-membered ring with a sulfur molecule substituted for one of the carbon molecules in the ring. BT ($C_8H_6S$) is a TP ring that is fused with a benzene ring at the 2- and 3-positions of the TP ring. Some of the benefits of isolating TP, BT, and their derivatives from the cracked naphtha stream and then manufacturing polymers from the isolated compounds include:

Sulfur compounds (e.g., TP, BT) with low industrial value can be converted to high value polymer compounds.

Sulfur contamination in petroleum products can be reduced without the use of a hydrotreating plant.

Manufacturing TP and BT polymers using TP and BT that are isolated from cracked naphtha removes sulfur compounds that are considered to be difficult to desulfurize, and the remaining cracked naphtha can be more easily hydrotreated to produce ultra-low sulfur gasoline with minimum cost.

TP and BT polymers exhibit better chemical and physical properties than the currently used polymers. For example, TP polymers exhibit (1) high specific capacitance, (2) strong conductive properties in a doped state, and (3) fast charge and discharge of electron-transfer kinetics (see Gnanakan et al., *Synthesis of Polythiophene Nanoparticles by Surfactant*, Int. J. of Electrochemical Science). As discussed in the Gnanakan paper, TP polymers are currently being studied for use in redox supercapacitors.

Figure 2A:
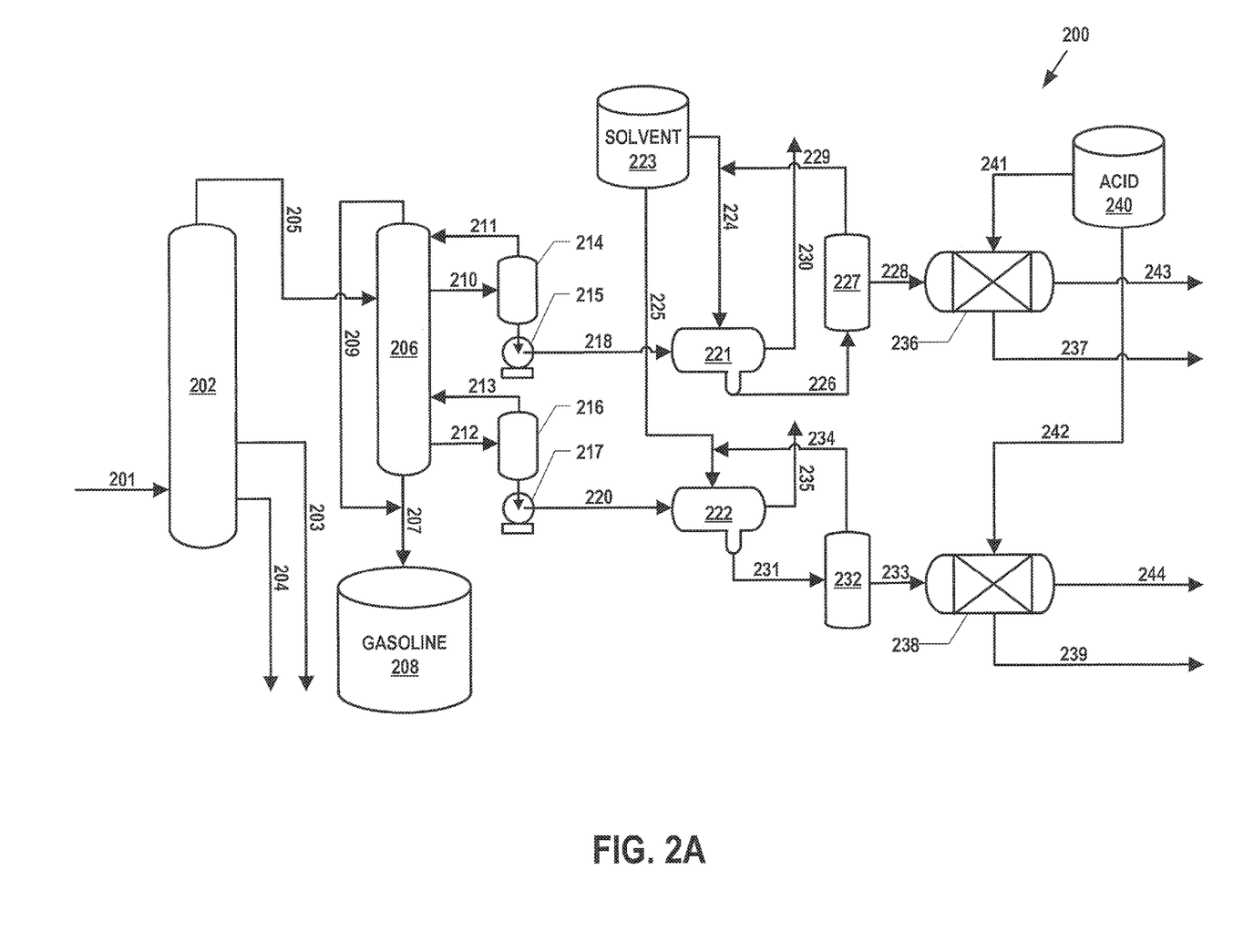
FIGS. 2A and 2B are schematic views of processes for generating polymers of sulfur-containing heterocyclic compounds in accordance with one or more embodiments.

A process 200 for manufacturing polymers in accordance with one or more embodiments of the invention is shown in FIG. 2. In this embodiment, the TP and BT are separated from FCC cracked naphtha stream 205 prior to polymerization. Reaction product gas stream 201 initially flows from a reactor (not shown) of the FCC unit to distillation column 202 (i.e., main fractionator). The reactor of the FCC unit typically extracts cracked product vapors from a catalytic riser to generate the reaction product gas stream 201. The reaction product gas stream 201 includes cracked hydrocarbons vapors as well as impurities such as TP, BT, and their derivatives.

In the distillation column 202, cracked naphtha stream 205 is separated from other FCC products (e.g., light diesel stream 203, heavy diesel stream 204) in the reaction product gas. Those skilled in the art will appreciate that the streams leaving the distillation column 202 are simplified in FIG. 2. The light diesel stream 203 and heavy diesel stream 204 are typically generated from side-cut streams, similar to the side-cut streams discussed in more detail below, and the cracked naphtha stream 205 is typically generated as the overhead product of the distillation column 202.

The cracked naphtha stream 205 is fed into secondary distillation column 206 that includes side-cut streams 210, 212 for TP and BT components respectively. Each of the side-cut streams 210, 212 separates TP or BT based on the boiling point of the side-cut streams' respective product. For example, the TP side-cut stream 210 can have a boiling range of 80-86° C., and the BT side-cut stream 212 can have a boiling range of 220-230° C. Those skilled in the art will appreciate that each of the side-cut streams 210, 212 can capture other compounds (e.g., paraffins, olefins, aromatic hydrocarbons) other than the desired product.

The cracked naphtha in the secondary distillation column 206 that is not extracted into the side-cut streams 210, 212 can be pumped out 207 or captured as overhead product in overhead cracked naphtha stream 209, condensed, and then fed into gasoline tank 208. Because a majority of the sulfur-containing compounds (e.g., TP, BT) have been removed from the cracked naphtha, the resulting cracked naphtha in the gasoline tank 208 can be used as a high-octane component of gasolines.

The separated TP side-cut stream 210 can flow and be condensed into tank 214, where pump 215 removes the separated TP. The separated TP side-cut stream 210 can be a vapor stream or a liquid stream, depending on the desired yield of TP. Those skilled in the art will appreciate that vapor streams typically result in a purer but lower yield of product. The TP side-cut stream 210 can have a boiling point range of between 82-86° C., where the boiling point of thiophene is about 84° C.

The secondary distillation column 206 can be designed and optimized to narrow the TP side-cut stream 210 to provide a high yield of TP. For example, the boiling point range of the TP side-cut stream 210 can be narrowed to 83-85° C. in order to reduce the amount of undesired compounds (i.e., compounds other than TP) in the TP stream 210. In another example, the TP side-cut stream 210 can be narrowed by introducing a stripping gas or vapor (e.g., steam) to distillates in the tank 214 in order to remove more volatile compounds.

Reflux stream 211 from the top of tank 214 returns hydrocarbon vapors to the secondary distillation column 206. In some embodiments, the reflux stream 211 can be used to more efficiently separate the TP in the secondary distillation column 206. In this case, the reflux stream 211 can provide cooling and partial condensation for the upflowing vapors in the secondary distillation column 206, thereby increasing the secondary distillation column's 206 ability to separate lower boiling compounds.

At this stage, the pump 215 supplies condensed TP stream 218 to solvent extraction tank 221. Solvent stream 224 from solvent tank 223 supplies extraction solvent to the solvent extraction tank 221. The solvent extraction performed in the solvent extraction tank 221 produces mixed stream 226 that includes extraction solvent and TP. The mixed stream 226 can also include a trace amount of other hydrocarbons. The mixed stream 226 can be supplied to solvent regeneration column 227 for recovering extraction solvent from the mixed stream 226. The recovered solvent stream 229 is returned to the solvent stream 224. Aprotic solvents such as acetonitrile, methylene chloride, or other suitable solvents can be used to perform the solvent extraction in the solvent extraction tank 221.

The compounds not captured by the solvent extraction can be supplied to a hydrocarbon stream 230. The hydrocarbon stream 230 can include hydrocarbons and a trace amount of TP or other sulfur-containing compounds. The hydrocarbon stream 230 can be returned to the secondary distillation column 206 or directly to the gasoline tank 208. Optionally, the hydrocarbon stream 230 can be wholly or partially recycled into the condensed TP stream 218 in order to further extract any remaining TP.

After the solvent is recovered, the extracted TP stream 228 is supplied to reactor 236, where the TP is mixed with a small amount of super acid, such as triflic acid or fluorosulfonic acid, supplied via acid stream 241 from acid tank 240. The reaction temperature can range from low, room temperature to as high as 75° C. The reaction in the reactor 236 can be performed with or without catalysts. Examples of catalysts that can be used to optimize the reaction include bismuth chloride and antimony chloride. Optionally, solvents such as methylene chloride can be used to increase a concentration of the TP, thereby increasing a rate of reaction of the TP and the super acid in the reactor 236.

Unreacted TP and other remaining compounds can be captured in reactant stream 243. Optionally, the reactant stream 243 can be wholly or partially recycled back into the extracted TP stream 228.

A super acid is generally an acid that is stronger than conventional mineral acids, typically with an acidity greater than that of 100% pure sulfuric acid. Super acids, or magic acids, exhibit an ability to protonate hydrocarbons due to their high acidity. In some embodiments, the super acid is triflic acid or fluorosulfonic acid.

Once the polymer is produced, the TP polymer can be separated and supplied in TP polymer stream 237 to a storage tank (not shown). For example, the TP polymer precipitates and is filtered out of the reactor 236 into the TP polymer stream 237. Optionally, the separated TP polymer can be washed with deionized water and/or methylene chloride to remove impurities.

Figure 3A:
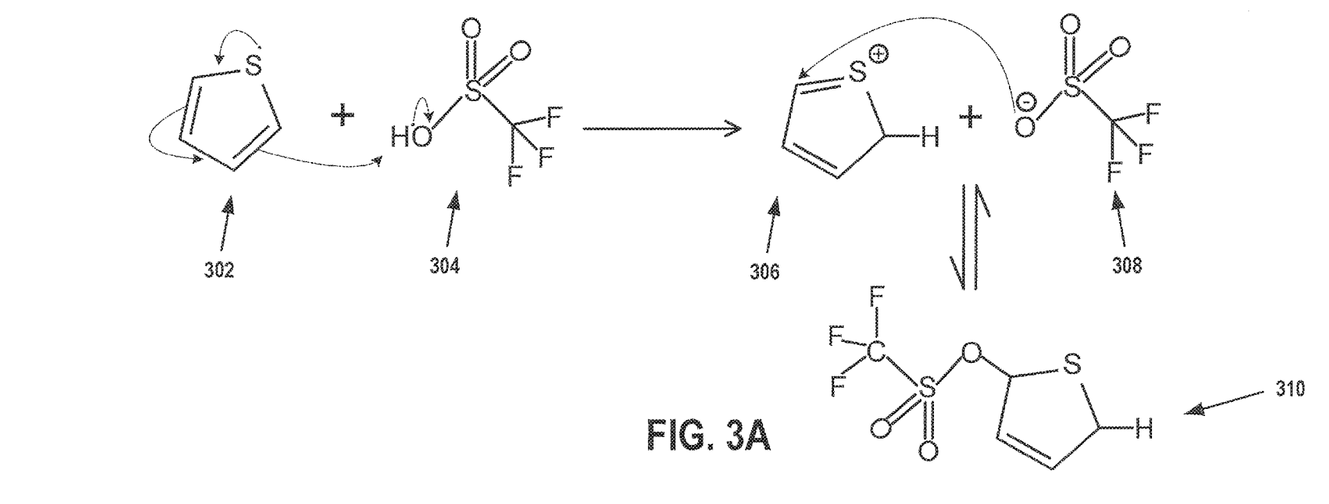
FIGS. 3A-3B and 4A-4B are example reactions for generating polymers of sulfur-containing heterocyclic compounds in accordance with one or more embodiments.
Figure 3B:
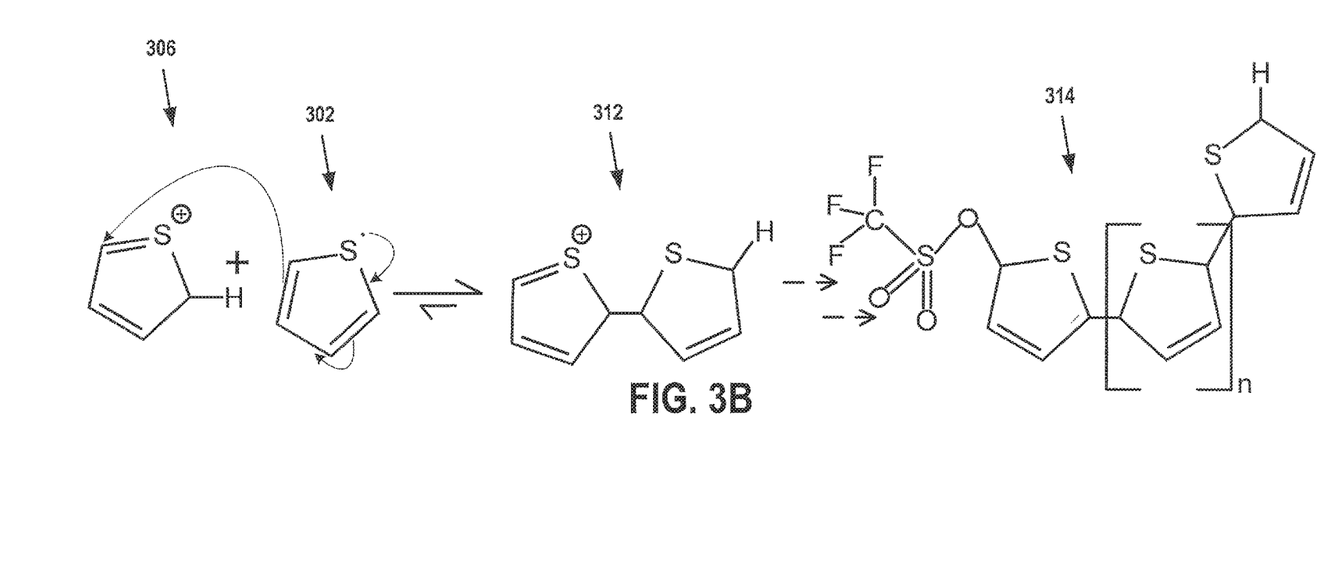

Without being bound by theory, FIGS. 3A-3B show an example reaction for manufacturing TP polymers using triflic acid. In FIG. 3A, TP 302 can be reacted with triflic acid ($CF_3SO_3H$) 304. The triflic acid 304 forms a hydrogen ion ($H^+$) in solution that pulls an electron off a cyclic bond of the TP 302. When losing the electron, the TP 302 cyclic bonds shift and pull an electron from the sulfur atom of the TP 302. At this stage, TP cation 306 and $CF_3SO_3^-$ ion 308 are produced, which react to form $C_5H_4F_3S_2O_3$ 310 until a dynamic equilibrium is reached.

In FIG. 3B, the TP cation 306 reacts with TP 302 to produce TP dimer 312. The reaction producing the TP dimer 312 has an equilibrium position that lies far to the right. The TP dimer 312 includes a positively charged sulfur atom, which can further bond with additional TP 302 to produce TP polymer 314. Additional TP 302 can be bonded to the TP polymer 314 to produce various lengths of polymeric material, the length depending on factors such as temperature and catalysts used.

Returning to FIG. 2, BT can be processed similar to the TP side-cut stream 210 described above. The separated BT side-cut stream 212 can flow and be condensed into tank 216, where pump 217 removes the separated BT. The separated BT side-cut stream 212 can be a vapor stream or a liquid stream, depending on the desired yield of BT. The BT side-cut stream 212 can have a boiling point range of between 218-224° C., where the boiling point of BT is 221° C.

The secondary distillation column 206 can be optimized to narrow the BT side-cut stream 212 in order to provide a high yield of BT. For example, the boiling point range of the BT side-cut stream 212 can be narrowed to 219-223° C. in order to reduce the amount of undesired compounds (i.e., compounds other than BT) in the BT side-cut stream 212. In another example, the BT side-cut stream 212 can be narrowed by introducing a stripping gas or vapor (e.g., steam) to distillates in the tank 216 in order to remove more volatile compounds.

Reflux stream 213 from the top of tank 216 returns hydrocarbon vapors to the secondary distillation column 206. In some embodiments, the reflux stream 213 can be used to more efficiently separate the BT in the secondary distillation column 206. In this case, the reflux stream 213 can provide cooling and partial condensation for the upflowing vapors in the secondary distillation column 206, thereby increasing the secondary distillation column's 206 ability to separate lower boiling compounds.

At this stage, the pump 217 supplies condensed BT stream 220 to solvent extraction tank 222. Solvent stream 225 from the solvent tank 223 supplies extraction solvent to the solvent extraction tank 222. The solvent extraction performed in the solvent extraction tank 222 produces mixed stream 231 that includes extraction solvent and BT. The mixed stream 231 can also include a trace amount of other hydrocarbons. The mixed stream 231 can be supplied to solvent regeneration column 232 for recovering extraction solvent from the mixed stream 231. The recovered solvent stream 234 is returned to the solvent stream 225. Aprotic solvents such as acetonitrile, methylene chloride, or other suitable solvents can be used to perform the solvent extraction in the solvent extraction tank 222.

The compounds not captured by the solvent extraction can be supplied to hydrocarbon stream 234. The hydrocarbon stream 234 can include hydrocarbons and a trace amount of BT or other sulfur-containing compounds. The hydrocarbon stream 234 can be returned to the secondary distillation column 206 or directly to the gasoline tank 208. Optionally, the hydrocarbon stream 234 can be wholly or partially recycled into the condensed BT stream 220 in order to further extract any remaining BT.

After the solvent is recovered, the extracted BT stream 233 is supplied to reactor 238, where the BT is mixed with a small amount of super acid, such as triflic acid or fluorosulfonic acid, supplied via acid stream 242 from the acid tank 240. The reaction temperature can range from low, room temperature to as high as 100° C. The reaction in the reactor 238 can be performed with or without catalysts. Examples of catalysts that can be used to optimize the reaction include bismuth chloride and antimony chloride. Optional, solvents such as methylene chloride can be used to increase concentration of BT, thereby increasing rate of reaction of the BT and the super acid in the reactor 238.

Unreacted BT and other remaining compounds can be captured in reactant stream 244. Optionally, the reactant stream 244 can be wholly or partially recycled back into the extracted BT stream 233.

Once the polymer is produced, the BT polymer can be separated and supplied in BT polymer stream 239 to a storage tank (not shown). For example, the BT polymer precipitates and is filtered out of the reactor 238 into the BT polymer stream 239. Optionally, the separated BT polymer can be washed with deionized water and/or methylene chloride to remove impurities.

Figure 4A:
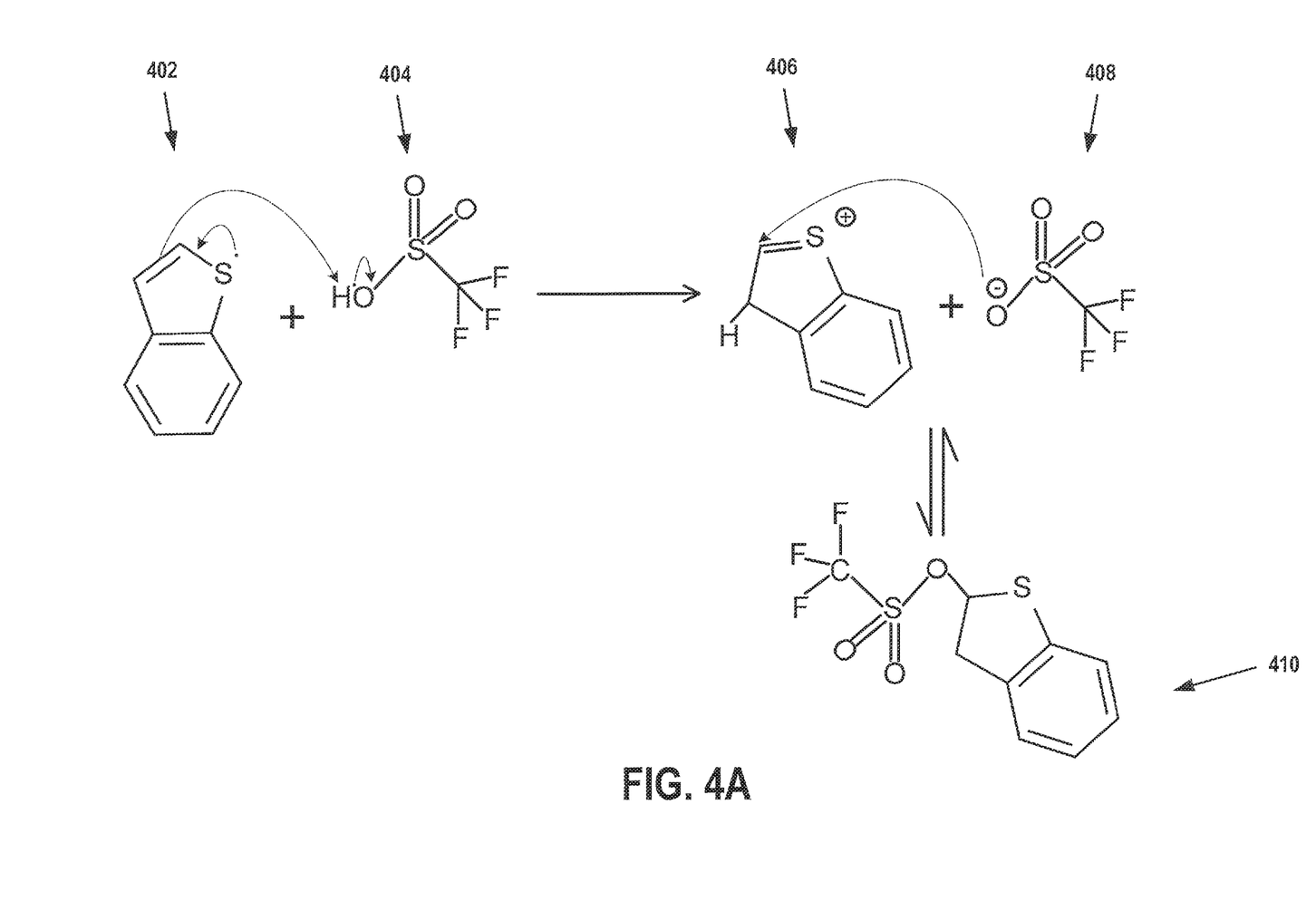
Figure 4B:
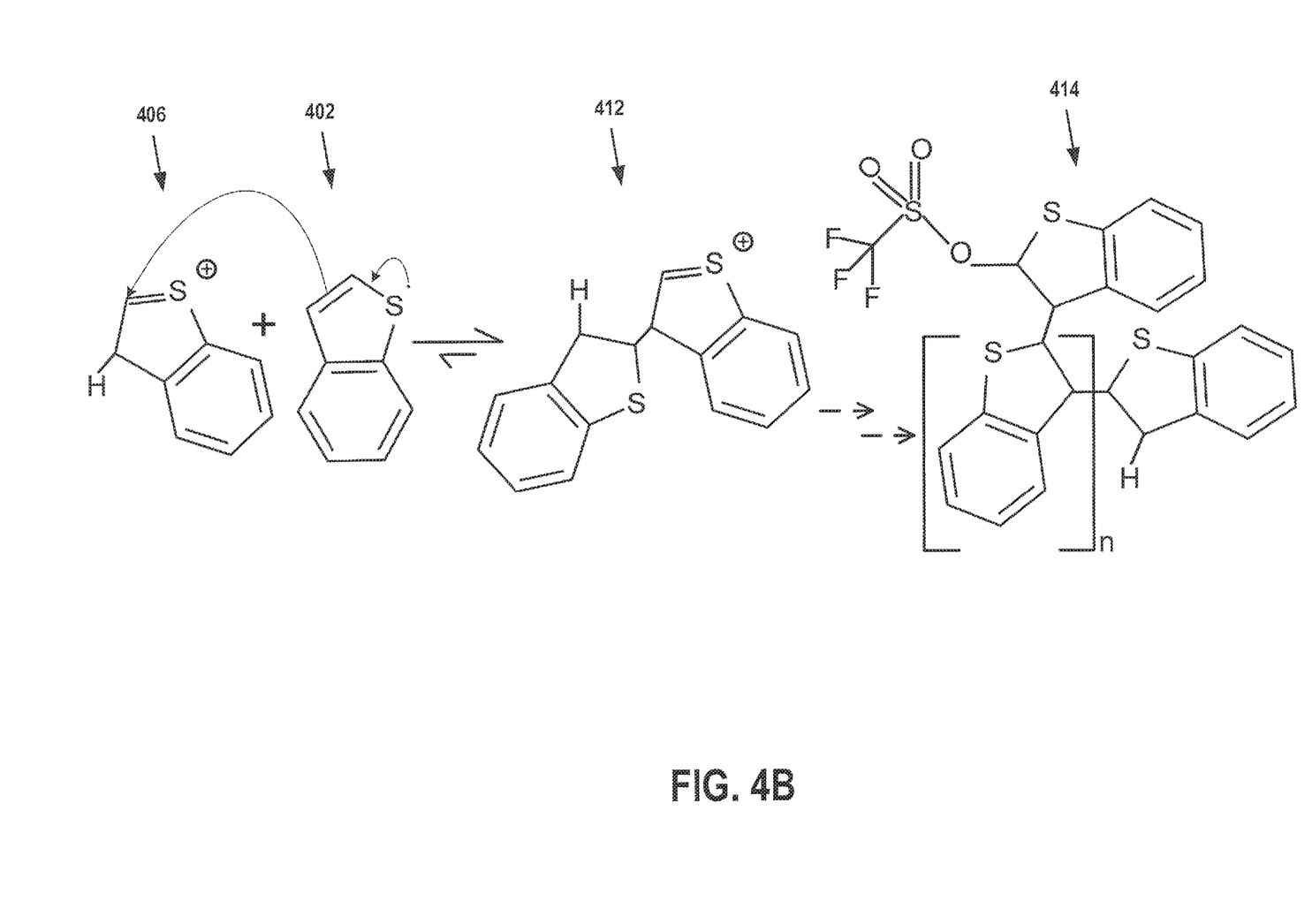

Without being bound by theory, FIGS. 4A-4B show an example reaction for manufacturing BT polymers using triflic acid. In FIG. 4A, BT 402 can be reacted with triflic acid ($CF_3SO_3H$) 404. The triflic acid 404 forms a hydrogen ion ($H^+$) in solution that pulls an electron off a cyclic bond of the BT 402. When losing the electron, the BT's 402 cyclic bonds shift and pull an electron from the sulfur atom of the BT 402. At this stage, BT cation 406 and $CF_3SO_3^-$ ion 408 are produced, which react to form $C_8H_6F_3S_2O_3$ 410 until a dynamic equilibrium is reached.

In FIG. 4B, the BT cation 406 reacts with BT 402 to produce BT dimer 412. The reaction producing the BT dimer 412 has an equilibrium position that lies far to the right. The BT dimer 412 includes a positively charged sulfur atom, which can further bond with additional BT 402 to produce BT polymer 414. Additional BT 402 can be bonded to the BT polymer 414 to produce various lengths of polymeric material, the length depending on factors such as temperature and catalysts used.

Figure 1:
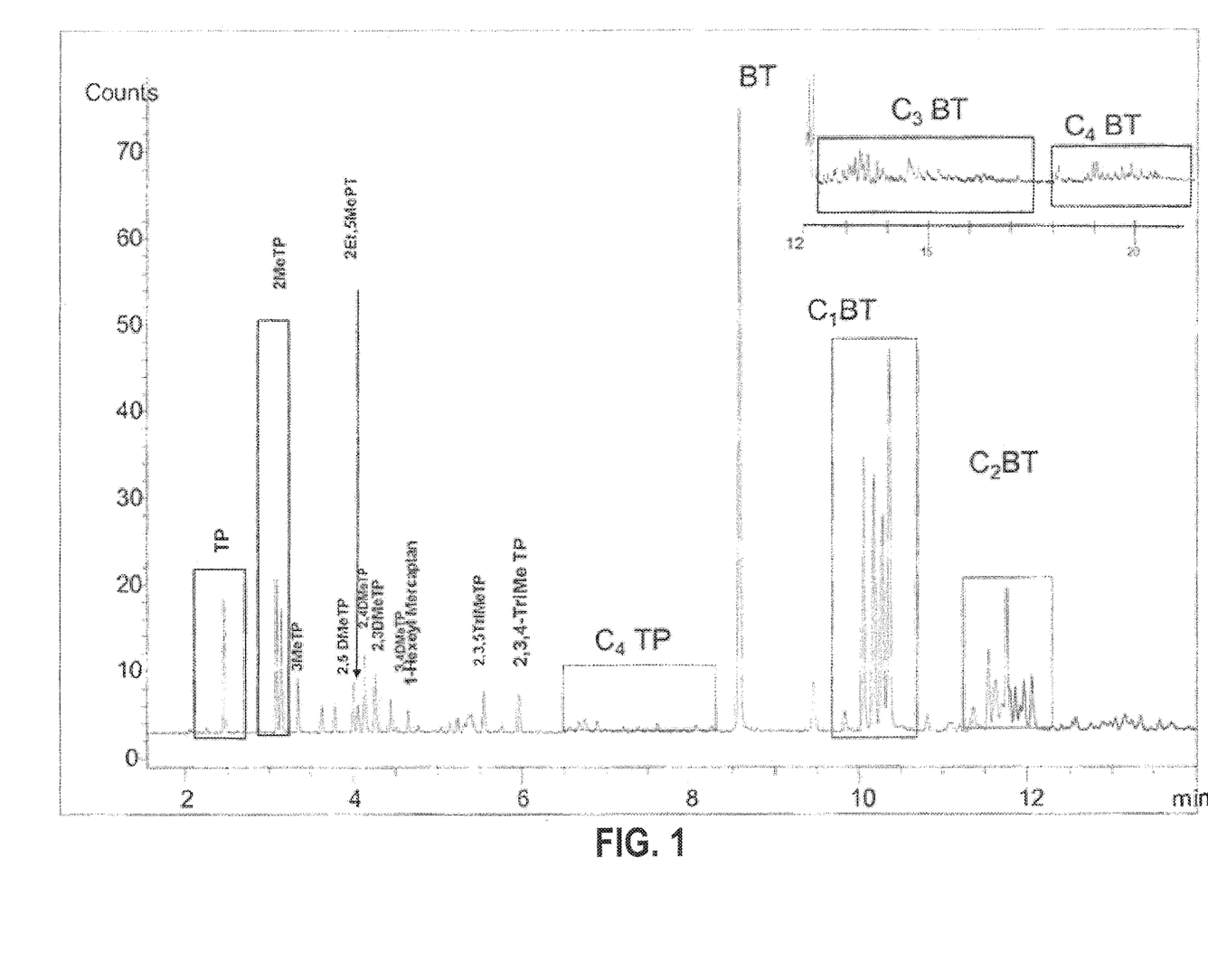
FIG. 1 is a gas chromatography chromatogram showing the speciation of thiophene, benzothiophene, and their derivatives in cracked naphtha.

In some embodiments, co-polymers can also be manufactured by mixing TP, BT, and super acid in the appropriate ratios to optimize desired physical and chemical properties. Further, other alkyl substituted TP and BT (as shown in FIG. 1 and TABLE 1) can be separated and processed as discussed above with respect to FIGS. 2A and 2B to manufacture polymers including alkylated TP and BT.

Figure 2B:
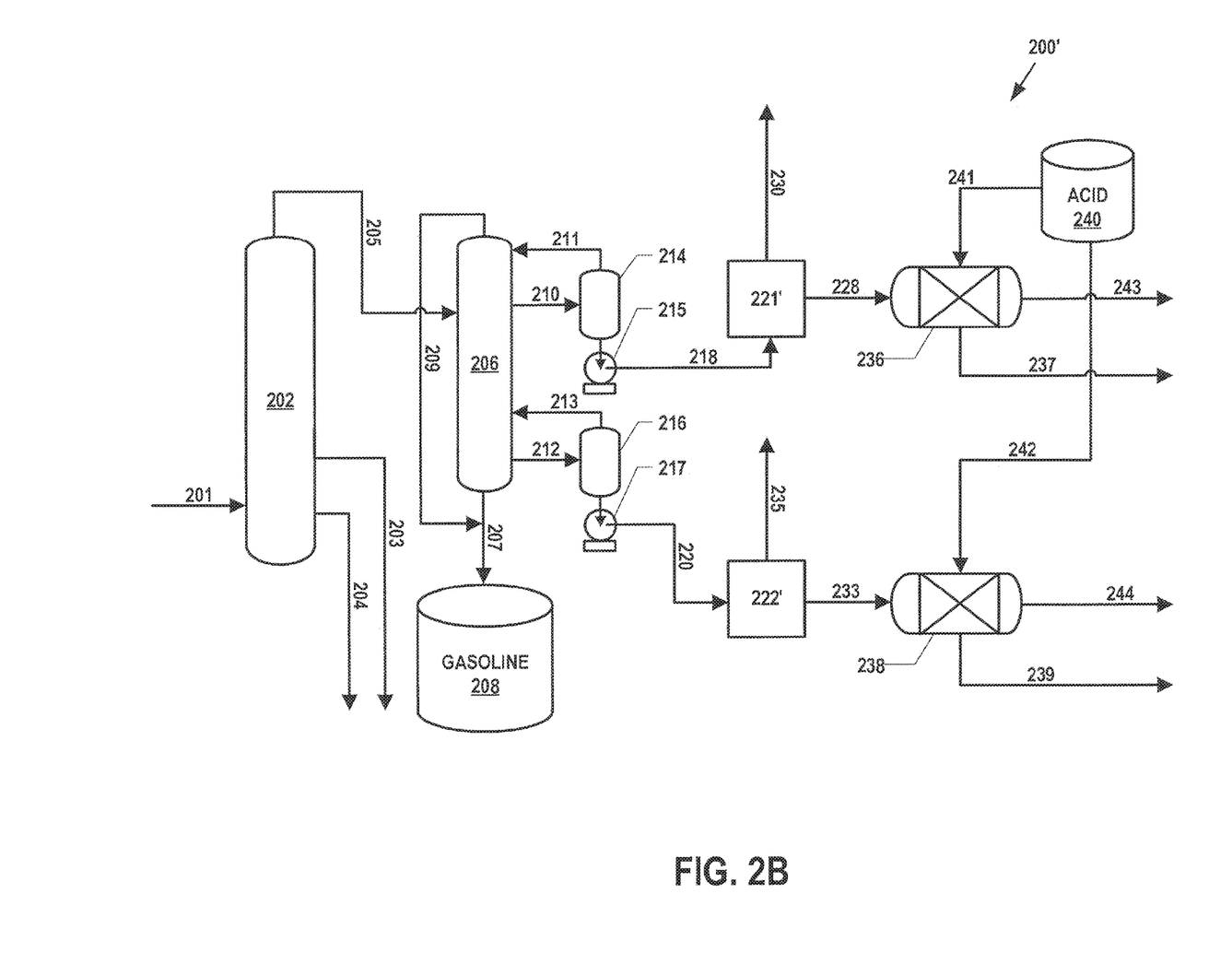

In other embodiments as shown in FIG. 2B, the TP and BT can be extracted from the cracked naphtha using techniques other than solvent extraction. The process 200' of FIG. 2B may be substantially the same as the process 200 of FIG. 2A except for the differences discussed below. Specifically, the components related to solvent extraction have been replaced in the process 200' of FIG. 2B with an alternative technique for isolating the TP and BT from the cracked naphtha. Examples of alternative techniques for isolating the TP and BT include additional fractionation, membrane separation, or other suitable techniques for isolating sulfur-containing heterocyclic compounds.

In embodiments using additional fractionation, additional distillation columns 221', 222' can be used to further purify the TP and BT, respectively. Side-cuts streams 228, 233 with narrower boiling point ranges than used in the secondary distillation column 206 can be used to further isolate the TP and BT, respectively, from other hydrocarbons. The compounds not captured by the side-cuts streams 228, 233 can be supplied to hydrocarbon streams 230, 235 respectively. The hydrocarbon streams 230, 235 can be returned to the secondary distillation column 206 or directly to the gasoline tank 208.

In embodiments using membrane separation, membrane separator 221', 222' can be used to further purify the TP and BT, respectively. In the membrane separator 221', 222', a suitable membrane can produce permeates of the target compound to supply the TP stream 228 and BT stream 233 respectively. Examples of suitable membranes include cross-linked fluorinated polyolefin membranes, polyesterimide membranes, and polyuria/urethane membrane (see U.S. Pat. No. 7,018,527, White et al., which is incorporated herein by reference). The compounds that fail to permeate through the membrane can be supplied to hydrocarbon streams 230, 235 respectively. The hydrocarbon streams 230, 235 can be returned to the secondary distillation column 206 or directly to the gasoline tank 208.

Though the embodiments discussed above include a limited number of extraction techniques, any number of the various extraction techniques can be performed in series to further purify the TP and BT for polymerization. Specifically, any number of distillation columns, solvent extraction tanks, and membrane separators along with their related components can be configured in series to purify the TP and BT being supplied to the reactors 236, 238 respectively.

Optionally, in some embodiments, the amount of TP and BT in the reaction product gas stream 201 of FIGS. 2A and 2B can be optimized by modifying the operating parameters of the FCC unit. For example, alkylthiophenes or alkylbenzothiophenes in the reaction product gas can be dealkylated to produce additional TP or BT, respectively.

In other embodiments, instead of isolating TP and BT from the products of an FCC unit, TP and BT can be obtained from other sources. For example, sulfur sources can be reacted with hydrocarbons to produce TP and BT directly. In this example, the directly produced TP and BT can be supplied as the TP stream 218 and BT stream 220, respectively, where the remainder of the process of FIG. 2A or 2B proceeds as discussed above to generate polymers. Additionally, TP and BT can be obtained from Thermal cracking processes, or a combination of FCC and Thermal cracking processes.

Those skilled in the art will appreciate that even though TP and BT are discussed specifically in the embodiments above, the alkylated derivatives of TP and BT can also be included in the processes of FIGS. 2A and 2B. For example, the boiling point ranges of the secondary distillation column 206 can be configured to include varying levels of alkylated derivatives of TP and BT in their respective side-cut streams. In this example, the polymers produced by the reactors 236, 238 can include both alkylated and non-alkylated forms of TP and BT respectively.

The following experimental steps can be performed at a lab scale to manufacture TP and BT polymers:
  Dissolve about 1 g of thiophene or benzothiophene in about 5 mL of methylene chloride as solvent.
  Add about 1 mL of triflic acid while stirring.
  Stir the solution at a low rate overnight.
  Filter the solid material (i.e., polymer) from the solution and wash the solid material with deionized water and methylene chloride as needed (e.g., two or three times).

Although the present embodiments have been described in detail, it should be understood that various changes, substitutions, and alterations can be made hereupon without departing from the principle and scope of the embodiments. Accordingly, the scope of the embodiments should be determined by the following claims and their appropriate legal equivalents.

The singular forms "a", "an" and "the" include plural referents, unless the context clearly dictates otherwise. Optional or optionally means that the subsequently described event or circumstances can or cannot occur. The description includes instances where the event or circumstance occurs and instances where it does not occur. Ranges can be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An apparatus for manufacturing polymers of sulfur-containing heterocyclic compounds, the apparatus comprising:
   a primary distillation column fluidly connected to an FCC unit, the primary distillation column adapted to isolate cracked naphtha from a reaction product gas stream of a fluid catalytic cracking unit:
   a secondary distillation column fluidly connected to the primary distillation column, the secondary distillation column adapted to isolate a sulfur-containing heterocyclic compound from the cracked naphtha in one or more side-cut streams, wherein the side-cut streams are separated according to a boiling point of the sulfur-containing heterocyclic compound;
   a solvent extraction tank fluidly connected to the secondary distillation column, the solvent extraction tank adapted to perform a solvent extraction using an aprotic solvent to further purify the sulfur-containing heterocyclic compound, wherein the aprotic solvent is acetonitrile or methylene chloride; and
   a reactor fluidly connected to the solvent extraction tank, the reactor reacts the sulfur-containing heterocyclic compound with a super acid to produce a polymer of the sulfur-containing heterocyclic compound.

2. The apparatus as claimed in claim 1, further comprising:
   a tertiary distillation column adapted to further isolate the sulfur-containing heterocyclic compound from other compounds of the cracked naphtha.

3. The apparatus as claimed in claim 1, further comprising:
   a membrane separator adapted to further isolate the sulfur-containing heterocyclic compound as permeate from other compounds of the cracked naphtha, wherein the membrane separator permeates the sulfur-containing heterocyclic compound using a cross-linked fluorinated polyolefin membrane, a polyester-imide membrane, a polyuria membrane, or a urethane membrane.

4. The apparatus as claimed in claim 1, wherein the boiling point of one side-cut stream is in the range from 82° C. to 86° C. and the sulfur-containing heterocyclic compound comprises thiophene.

5. The apparatus as claimed in claim 1, wherein the boiling point of one side-cut stream is in the range from 218° C. to 224° C. and the sulfur-containing heterocyclic compound comprises benzothiophene.

6. The apparatus as claimed in claim 1, wherein the boiling point of one side-cut stream is in the range from 82° C. to 86° C. and the one side-cut stream comprises thiophene, and wherein the boiling point of a second side-cut stream is in the range from 218° C. to 224° C. and the second side-cut stream comprises benzothiophene.

* * * * *